US008773757B2

(12) United States Patent
Chen et al.

(10) Patent No.: US 8,773,757 B2
(45) Date of Patent: Jul. 8, 2014

(54) SLIT-SCAN MULTI-WAVELENGTH CONFOCAL LENS MODULE AND SLIT-SCAN MICROSCOPIC SYSTEM AND METHOD USING THE SAME

(75) Inventors: Liang-Chia Chen, Taipei County (TW); Chao-Nan Chen, Hsinchu (TW); Yi-Wei Chang, Yilan County (TW)

(73) Assignee: National Taipei University of Technology, Taipei (TW)

( * ) Notice: Subject to any disclaimer, the term of this patent is extended or adjusted under 35 U.S.C. 154(b) by 377 days.

(21) Appl. No.: 12/691,803

(22) Filed: Jan. 22, 2010

(65) Prior Publication Data

US 2010/0188742 A1 Jul. 29, 2010

(30) Foreign Application Priority Data

Jan. 23, 2009 (TW) .............................. 98102821 A

(51) Int. Cl.
*G02B 21/00* (2006.01)
*G02B 21/06* (2006.01)
(52) U.S. Cl.
CPC ............ *G02B 21/0064* (2013.01); *G02B 21/00* (2013.01); *G02B 21/0032* (2013.01)
USPC ............................ 359/368; 359/385; 359/656
(58) Field of Classification Search
USPC .................................. 359/368–390, 637, 642
See application file for complete search history.

(56) References Cited

U.S. PATENT DOCUMENTS

| | | | |
|---|---|---|---|
| 4,965,441 A | 10/1990 | Picard | |
| 5,165,063 A * | 11/1992 | Strater et al. | 356/4.01 |
| 5,218,193 A * | 6/1993 | Miyatake | 250/201.4 |
| 5,657,171 A * | 8/1997 | Maruyama et al. | 359/793 |
| 5,785,651 A | 7/1998 | Kuhn et al. | |
| 6,369,845 B1 * | 4/2002 | Kubota et al. | 347/258 |
| 6,674,572 B1 * | 1/2004 | Scheruebl et al. | 359/368 |
| 6,934,019 B2 * | 8/2005 | Geffen et al. | 356/237.4 |
| 8,599,372 B2 * | 12/2013 | Chen et al. | 356/300 |
| 2004/0109170 A1 | 6/2004 | Schick | |
| 2005/0254400 A1 * | 11/2005 | Nishikawa | 369/112.23 |
| 2006/0268286 A1 * | 11/2006 | Cao et al. | 356/624 |
| 2007/0206160 A1 * | 9/2007 | McDowall | 353/77 |
| 2009/0015935 A1 * | 1/2009 | Szapiel et al. | 359/674 |
| 2012/0019821 A1 * | 1/2012 | Chen et al. | 356/303 |

FOREIGN PATENT DOCUMENTS

CN         1950670         4/2007

* cited by examiner

*Primary Examiner* — Thong Nguyen

(74) *Attorney, Agent, or Firm* — WPAT, PC; Justin King

(57) ABSTRACT

The present invention provides a slit-scan multi-wavelength confocal lens module, utilizing at least two lenses having chromatic aberration for splitting a broadband light into continuously linear spectral lights having different focal length respectively. The present invention utilizes the confocal lens module employing slit-scan confocal principle and chromatic dispersion techniques and the confocal microscopy with optical sectioning ability and high resolution in spectral dispersion to establish a confocal microscopy method and system with long DOF and high resolution, capable of modulating a broadband light to produce the axial chromatic dispersion and focus on different depths toward an object's surface for obtaining the reflected light spectrum from the surface. Thereafter, the spectrum is spatially filtered by a slit and then a peak position with respect to the filtered spectrum along the scanning line is detected by a spectral image sensing unit for generating the sectional profile of the measured surface.

12 Claims, 18 Drawing Sheets

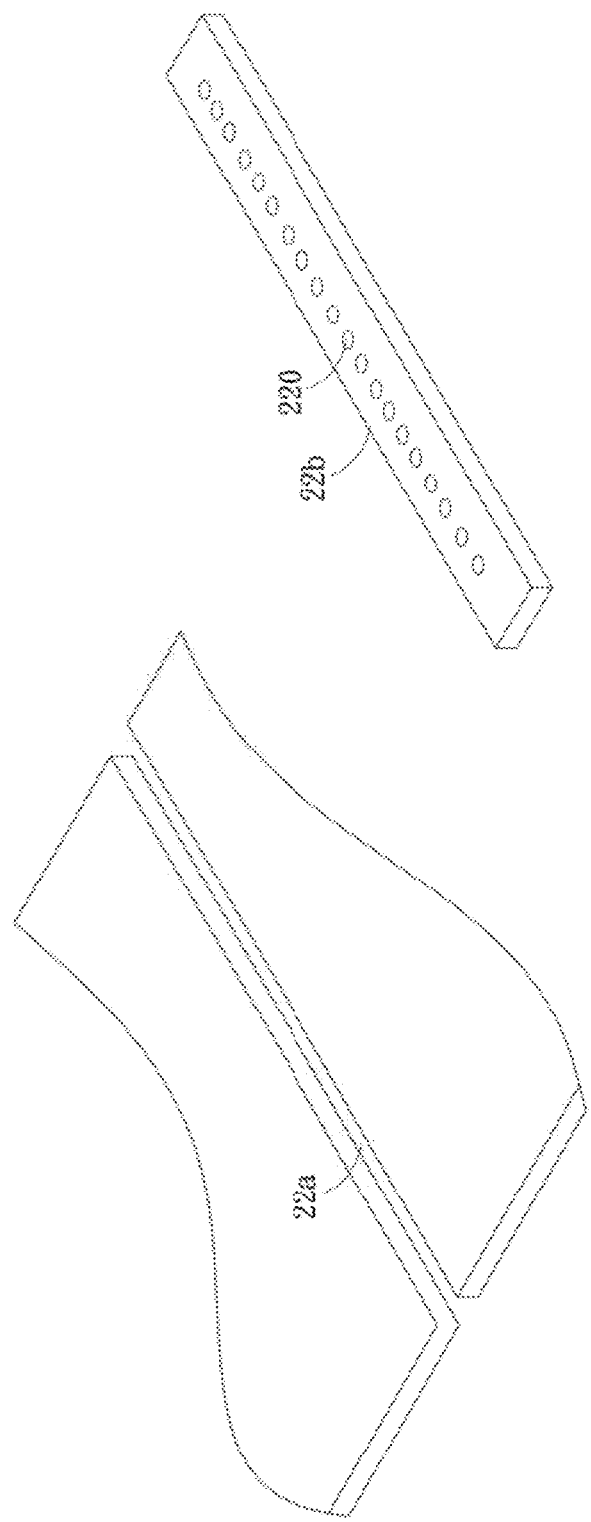

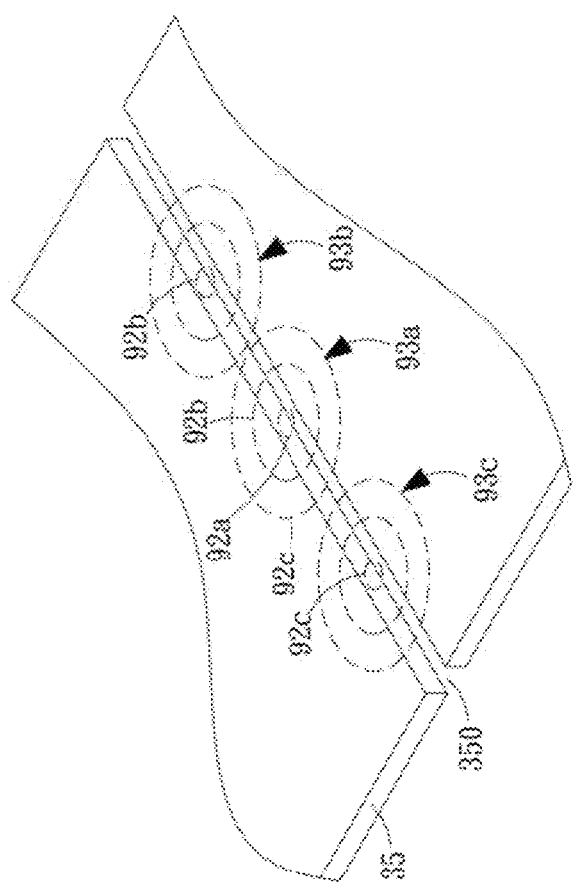

SLIT-SCAN MULTI-WAVELENGTH CONFOCAL LENS MODULE AND SLIT-SCAN MICROSCOPIC SYSTEM AND METHOD USING THE SAME

FIELD OF THE INVENTION

The present invention relates to a three-dimensional optical surface profilometry technique, and more particularly, to a slit scan lens module and microscopic system and method having capability of long depth-of-field (DOF) and high resolution by means of combining slit-scan confocal principle and broadband chromatic dispersion technique.

BACKGROUND OF THE INVENTION

In the industries utilizing high precision microstructure processing such as IC industry, semiconductor industry, LCD industry, automation industry, electro-optical measurement industry, and so on, a three-dimensional surface profile measurement is always the key procedure required for ensuring the consistency of their manufacturing process. Among all those currently available surface profile measurement techniques, the most commonly used are those optical or electro-optical measuring methods since they can perform a surface profile measuring process in an non-contact manner for accurately inspecting any microstructure formed on the surface of measured object with regard to its profile, thickness or size. There are many optical measurement techniques currently available, including confocal microscopy, phase-shifting interferometry, and white-light vertical scanning interferometry, etc. They are designed for different measurement environments and for different applications.

Conventionally, confocal microscopy is an optical imaging technique used to reconstruct three-dimensional images of a measured object by using a spatial pinhole to eliminate out-of-focus light or flare in the measured object that are thicker than the focal plane. As only one point is illuminated at a time in confocal microscopy, 2D or 3D imaging of the measured object requires scanning over a regular raster in the specimen that usually includes a fast horizontal scan in conjunction with a slower vertical scan for generating optical sections of different depths relating to the measured object. Thereafter, by the use of computers for performing a reconstructing process upon the obtained optical sections of different depths, an image containing information relating to the three-dimensional profile of the measured object can be obtained.

There are already many studies relating to the use of confocal microscopy, for instance, the confocal wafer inspection system disclosed in U.S. Pat. No. 6,934,019. As shown in FIG. 1, a confocal imaging optical setup is an optical setup for imaging a point of light source "S" 11 through a lens 12 into a sharply focused second point "S1" 13 and then reversing the image from the second point 13 onto a splitter 14 that reflects the image onto a tiny spatial filter "S2" 15. Field extension can be obtained by stretching the chromatic aberration of the focusing lens 12 having a setup with an infinity of purely confocal systems, one for each wavelength with a different sharply focused point 13a, 13b, 13c and so on. For example, the first color has a first sharply focused point 13a, the second color has second sharply focused point 13b and the third color has a third sharply focused point 13c. Moreover, only one color arrives to the filter 15, according to height of the surface, which matches the focus length. If the surface height matches the first sharply focused point 13a, then the first color is detected, if the surface height matches the second sharply focused point 13b the second color is detected and so on. By placing an inspected wafer on a movable platform or enabling the whole confocal imaging optical setup to be movable in relative to the inspected wafer, height information relating to the three-dimensional profile of the inspected wafer can be obtained. Since such an optical setup of point light field is absolutely blind for all the space except for the sharply focused second point 13, one inspection can only inspect one single dot on the wafer surface that the process for inspection the whole surface of the inspected wafer can be very time consuming and thus might cause the production yield of wafer manufacturing to drop significantly. It is noted that since only one color can arrive to the filter 15 for imaging at each inspection, the obtained image is monochrome that can simply be detected and analyzed by the use of spectrometer.

There is another confocal microscope disclosed in U.S. Pat. No. 5,785,651. In the operation of a confocal microscope disclosed in this US patent, the polychromatic light from a light source is projected onto a achromatic collimator lens where it is collimated without undue chromatic aberration and then be projected onto a Fresnel optical element so as to form a spectral spread light field, where the focal point of the projected light varies according to wavelength, to be used for inspecting the surface profile of a measured object. Similarly, since the polychromatic light is modulated into a spectral spread light field, where the focal point of the projected light varies according to wavelength, one inspection using the aforesaid confocal microscope can only inspect one single dot on the measured object that the process for inspection the whole surface of the measured object can be very time consuming and thus might cause the production efficiency to drop significantly, and also since only one color can arrive to the imaging device for imaging at each inspection, the obtained image is monochrome that can simply be detected and analyzed by the use of spectrometer.

Yet, there is another confocal distance sensor disclosed in U.S. Pat. Pub. No. 2004/0109170. The aforesaid confocal distance sensor is for rapid optical distance measurement based on the confocal imaging principle, by which different spectral components of the illuminating light are focused at different distances from the optical imaging system due to a chromatic aberration of the optical imaging system. Nevertheless, although the aforesaid confocal distance sensor can be adapted for inspecting the surface profile of a measured object, it can also only capable of inspection one single dot on a measured object during one inspection.

Please refer to FIG. 1B, which is a schematic diagram showing a conventional optical device using a diffractive optical element (DOE) for generating a liner linear dispersion field. In FIG. 1B, the optical device 16 projects a broadband light emitted from a broadband light source 160 to a diffractive optical element (DOE) 165 through a semi-cylindrical lens 161, a slit 162, a collimation lens 163 and a beam splitter 164 so as to form a linear dispersion field. Since the numerical aperture (NA) of the linear dispersion field generated from the DOE 165 is comparatively lower, the linear light field is required to be collimated by the use of another collimation lens 166 before it is guided to an objective lens 167 for projecting the same onto a measured object 1000, where it is reflected back to the objective lens 167 and then being guided to another slit 169 through the beam splitter 164 and a conjugate lens 168. After passing through the slit 169, the resulting light field is modulated by a lens 170 and a light grid 171 and then being detected by an image sensor 172 to be used for generate an image of the measured object accordingly. Although the required liner linear dispersion field can be generated by the DOE, there are a considerable amount of components in the aforesaid optical device that not only it is very complex and bulky in view of system design, but also it may be very expensive to build.

SUMMARY OF THE INVENTION

The object of the present invention is to provide a slit-scan multi-wavelength confocal lens module, which utilizes at least two lenses having chromatic aberration for splitting a broadband light field into a plurality of continuously linear spectral lights having different focal lengths respectively while projecting the plurality of continuously linear spectral lights onto an object. Unlike the conventional diffractive optical element having drawback of lower numerical aperture (NA) so that it can't be combined with the objective, the numerical aperture (Na) of the at least two lenses having chromatic aberration are about the same as those conventional objective lens such that they can be used directly as the objective lens Moreover, the problem relating to the field curvature is considered and calibrated during the designing of the at least two lenses having chromatic aberration in the confocal lens module so that performance of the confocal lens module is optimized as well as its size is minimized Another object of the present invention is to provide a slit-scan multi-wavelength confocal lens module, being capable of not only enabling a broadband light field to be split into continuously linear spectral lights, but also enabling the broadband light field to be focused on a same plane after being reflected so as to overcome the problems relating to the field curvature and simplify the complex of conventional linear dispersion systems.

It is yet another object of the present invention to provide a slit-scan multi-wavelength confocal microscopic method and system, capable of using specific lens of chromatic aberration for modulating a broad band light field to produce the axial chromatic aberration light comprising a plurality of sub linear light fields having different focal lengths and then obtain the reflected light spectrum with respect to surface of an object. Following this, the spectrum is spatially filtered by a slit and then a peak position with respect to the filtered spectrum for every measuring point along the scanning line is detected by a spectrometer for generating the sectional profile of the measured surface efficiently and accurately, thereby, the measuring speed of the confocal microscopic method and system can be improved greatly so that they can be adapted to be used as an online measuring method and system.

It is further another object of the invention to provide a slit-scan multi-wavelength confocal microscopic method and system, being capable of obtaining a full-field surface profile of an object by a linear displacement movement, so as to overcome the shortcoming of point measurement of the conventional confocal microscopic method and system.

In an exemplary embodiment of the invention, a slit-scan multi-wavelength confocal lens module is provided, which comprises: a linear light source module, for providing a linear light field; a spatial filter; and a chromatic dispersion objective lens, disposed at a side of the linear light source module, having at least two chromatic aberration lenses for modulating the linear light field into an axial chromatic dispersion light projecting onto an object and reflected therefrom, wherein the axial chromatic dispersion light comprises a plurality of sub linear light fields having different focal lengths and corresponding wavelengths respectively, and each of the reflected sub linear light field focuses on the spatial filter at various focal positions and passes therethrough.

In another exemplary embodiment of the invention, a slit-scan multi-wavelength confocal microscopic system is provided, which comprises: a light source module, for providing a linear light field; a spatial filter; a chromatic dispersion objective lens, disposed at a side of the linear light source module, having at least two chromatic aberration lenses for modulating the linear light field into an axial chromatic dispersion light projecting onto an object and reflected therefrom, wherein the axial chromatic dispersion light comprises a plurality of sub linear light fields having different focal lengths and corresponding wavelengths respectively, and each of the reflected sub linear light field focuses on the spatial filter at various focal positions and passes therethrough; a spectral image sensing unit, for dispersing and sensing the plurality of the reflected sub linear light fields so as to form a spectral image; and a processing unit, electrically coupled with the spectral image sensing unit and the light source module for receiving and processing the spectral image so as to generate a sectional profile with respect to the object.

Yet, in another exemplary embodiment of the invention, a slit-scan multi-wavelength confocal microscopic method is provided, which comprises the steps of: providing a linear light field; using a chromatic dispersion objective lens for dispersing the linear light field thereby generating an axial chromatic dispersion light comprising a plurality of sub linear light fields having different focal lengths and corresponding wavelengths respectively; enabling the plurality of the sub linear light fields to be reflected from an object and focus on a spatial filter at various focal positions; dispersing the plurality of the reflected sub linear light fields passing through the spatial filter; sensing the plurality of the dispersed reflected sub linear light fields so as to form a spectral image; and analyzing the spectral image for reconstructing a sectional profile with respect to the object.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 5A to FIG. 5C shows three spatial filters according to the different embodiments of the invention.

FIG. 8B and FIG. 8C are schematic diagrams showing how the plurality of sub linear light fields of the invention are reflected and focused onto the spatial filter.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1A:
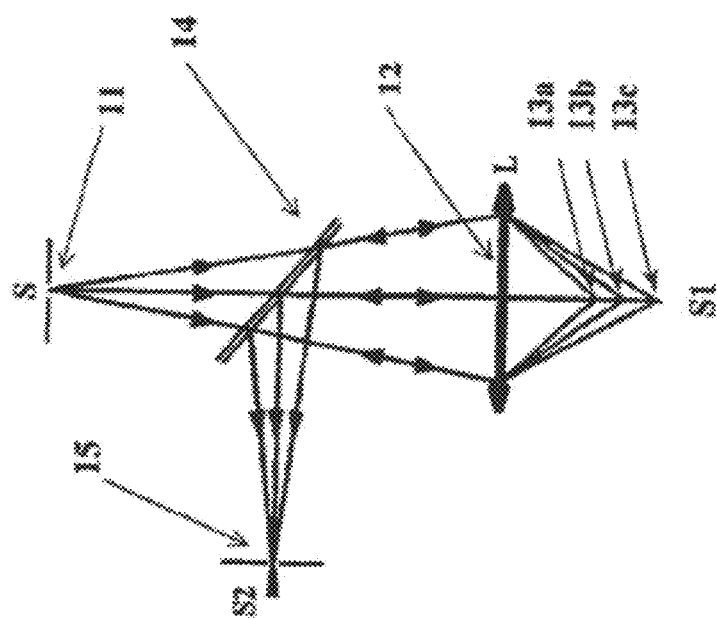
FIG. 1A shows a confocal wafer inspection system disclosed in U.S. Pat. No. 6,934,019.
Figure 1B:
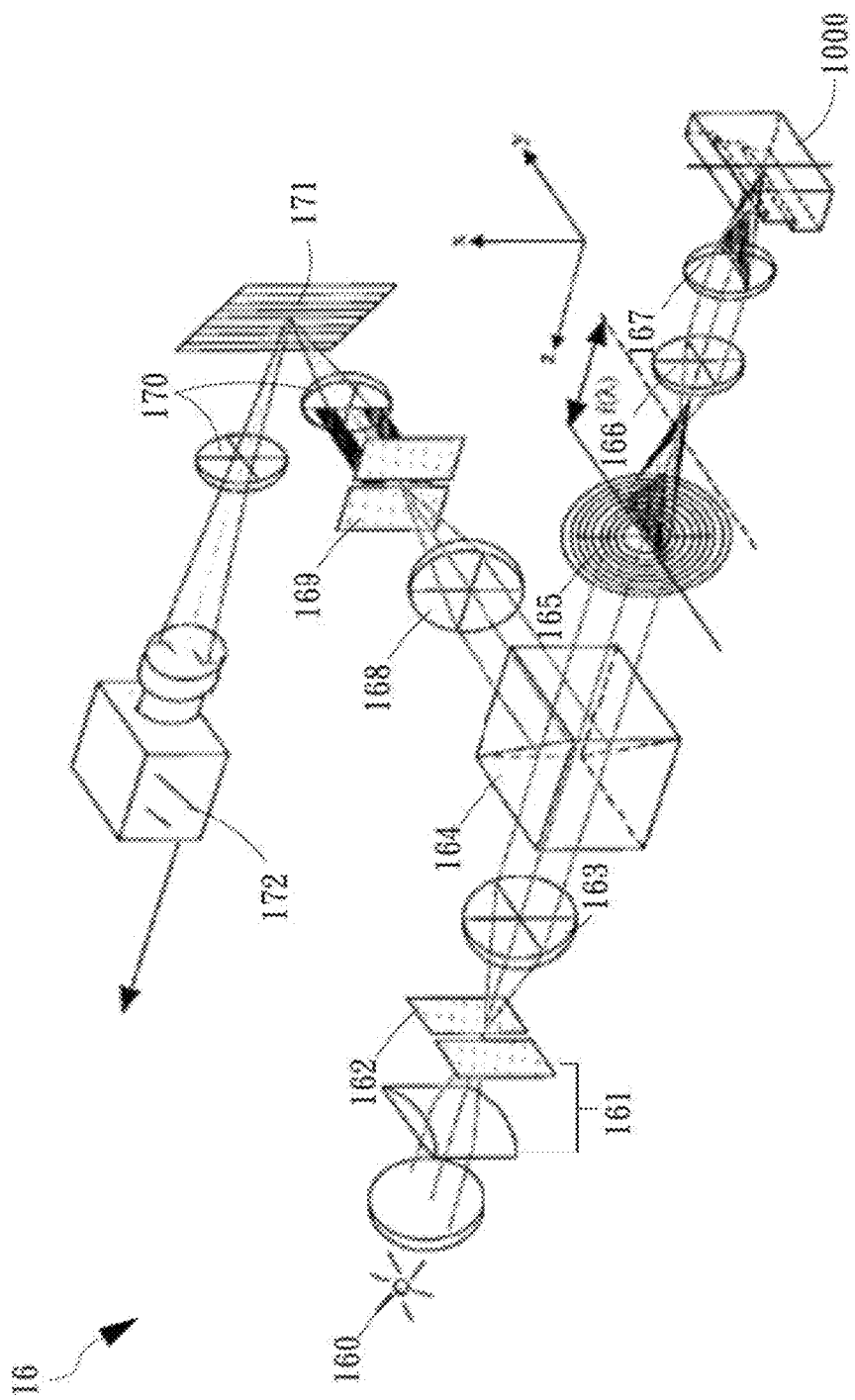
FIG. 1B is a schematic diagram showing a conventional optical device using a diffractive optical element (DOE) for generating a liner linear dispersion field.
Figure 2:
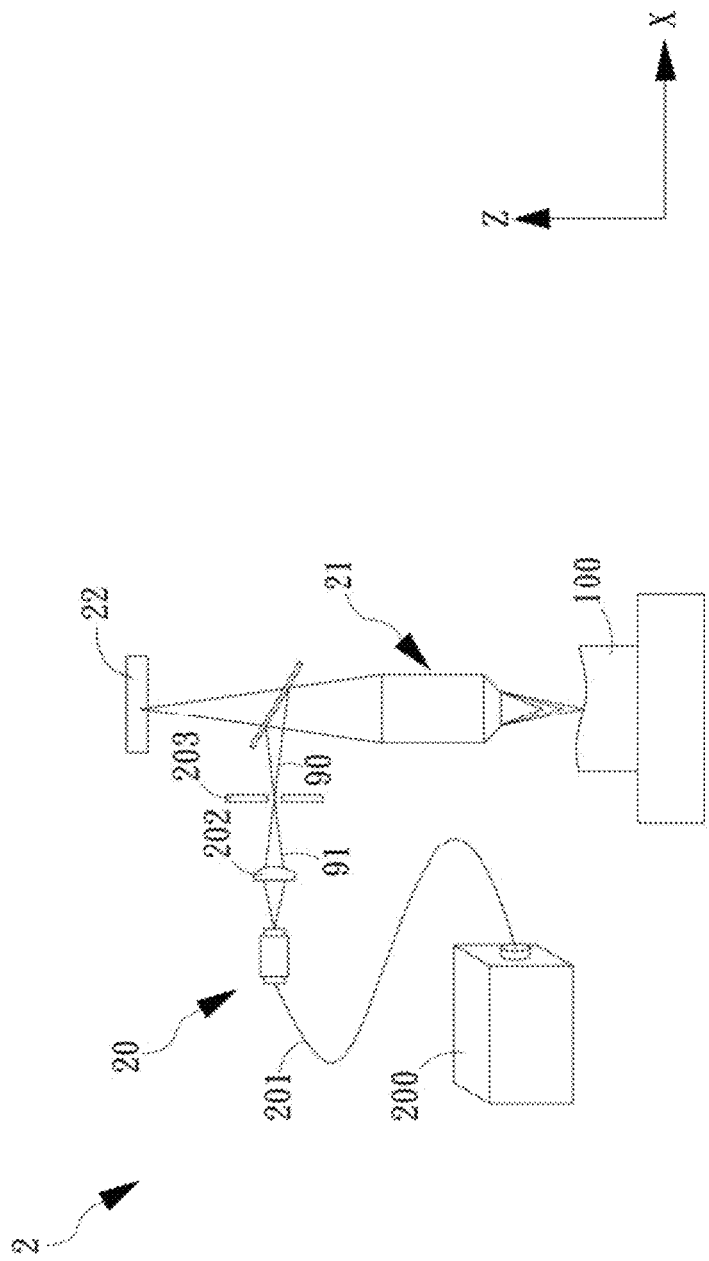
FIG. 2 is a schematic diagram showing a slit-scan multi-wavelength confocal lens module according to an embodiment of the invention.

Please refer to FIG. 2, which is a schematic diagram showing an embodiment of the invention. In this embodiment, a slit-scan multi-wavelength confocal lens module 2 is provided, which comprises: a linear light source module 20, for providing a linear light field 90; a spatial filter 22; and a chromatic dispersion objective lens 21. There can be various ways for generating the aforesaid linear light field 90 so that the light source module 20 of the present invention is not limited to the aforesaid linear light source module 20 shown in FIG. 2. The linear light source module in FIG. 2 is composed of a light source 200, a light guide 201, a lens set 202 and a spatial filter 203. The light source 200 is used for providing an incident light. In the present embodiment, the light source 200 is a broadband light source for providing a broadband light field comprising beams having various wavelengths. The light guide 201 is connected with the light source 200 for guiding the incident light, wherein example materials of the light guide 201 include, but should not be limited to, an optical fiber. Although there is a light guide 201 configured in the present embodiment, it is not a must-have device that it is used and selected only when required. The lens set 202 is coupled to the light guide 201 for modulating the incident light into a focusing light beam 91. In the present embodiment, the lens set 202 can be a cylindrical lens or a semi-cylindrical lens or the combination thereof. The spatial filter 203 is used for spatially filtering the focusing light beam 91 thereby forming the linear light field 90.

Figure 3A:
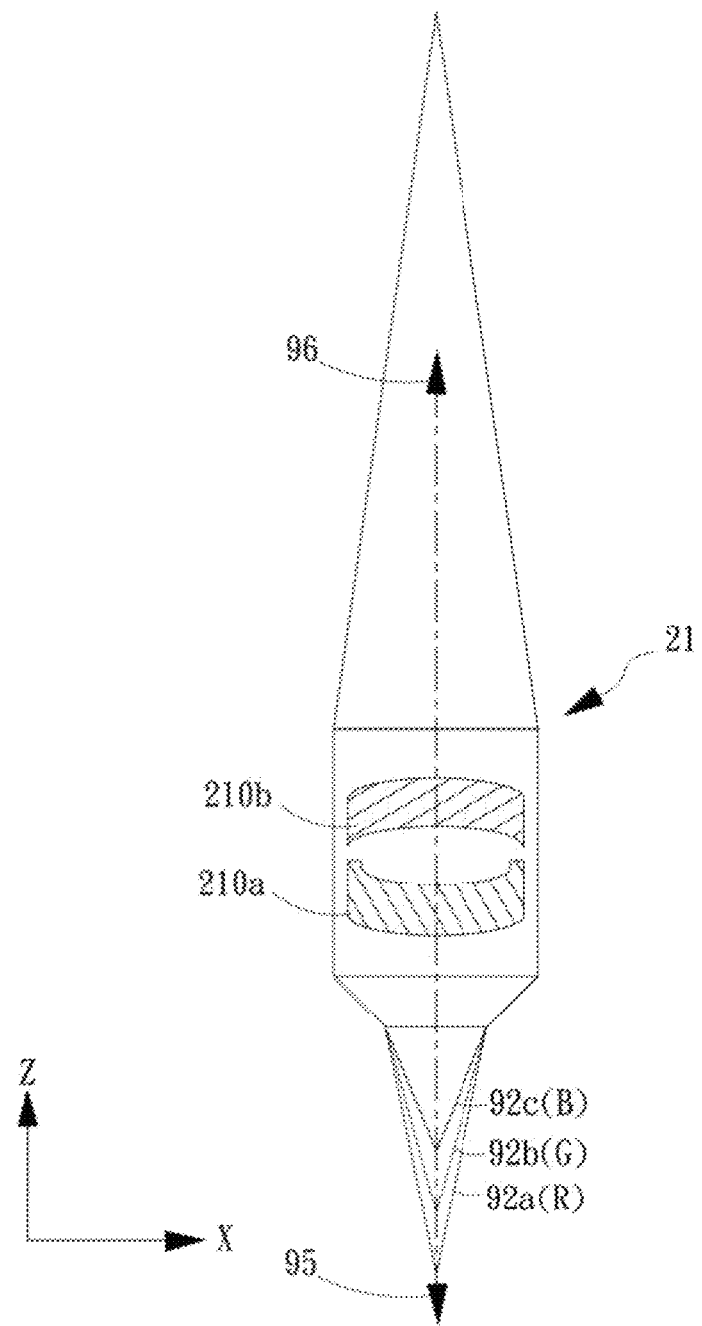
FIG. 3A and FIG. 3B are schematic diagrams showing two different chromatic dispersion objective lenses of the invention.
Figure 3B:
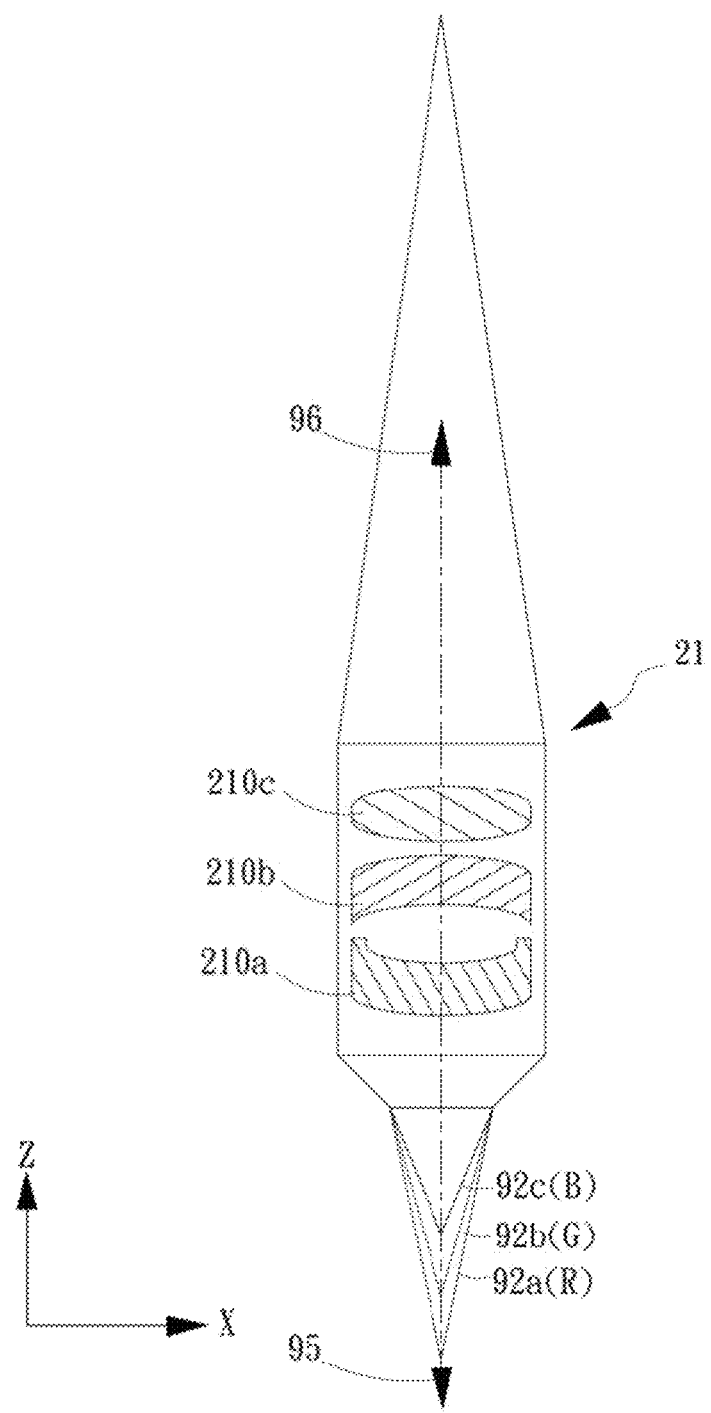

Please refer to FIG. 3A and FIG. 3B, which are schematic diagrams respectively showing two different embodiments of the chromatic dispersion objective lenses of the invention. The chromatic dispersion objective lens 21 is comprised of at least two chromatic aberration lenses. In the embodiment shown in FIG. 3A, the chromatic dispersion objective lens 21 is composed of two chromatic aberration lens 210a and 210b; and in the embodiment shown in FIG. 3B, the chromatic dispersion objective lens 21 is composed of three chromatic aberration lens 210a-210c. The chromatic dispersion objective lens 21 is used for modulating the linear light field 90 into an axial chromatic dispersion light 95 having continuous light spectrum, wherein the axial chromatic dispersion light 95 is composed of a plurality of sub linear light fields having different focal lengths and wavelengths respectively. In FIGS. 3A and 3B, the three sub linear light fields 92a, 92b 92c is utilized to represent the plurality of sub linear light fields for explanation in the following. The plurality of the sub linear light fields 92a, 92b, 92c are then being projected onto the surface of an object 100 and the light fields 96 reflect therefrom to focuse on the spatial filter 22 at various focal positions by passing through the chromatic dispersion objective lens 21. It is noted that the object 100 can include, but should not be limited to, a measured object, a reference surface or a platform carrying a measured object. In the present embodiment, the object 100 is a measured object. In the present embodiment, the plurality of the sub linear light fields can be visible lights or/and invisible lights having continuous spectrum. For clarity and illustration, in the embodiments of the invention, the sub linear light fields 92a is defined to be a red light field 92a(R), the sub linear light field 92b is defined to be a green light field 92b(G), and the sub linear light field 92c is defined to be a blue light field 92c(B). It is noted that the red, green, and blue light field 92a(R), 92b(G), and 92c(B) are utilized for explanation, so it should not be a limitation for limiting the scope of the plurality sub linear light fields in the present invention.

Figure 4:
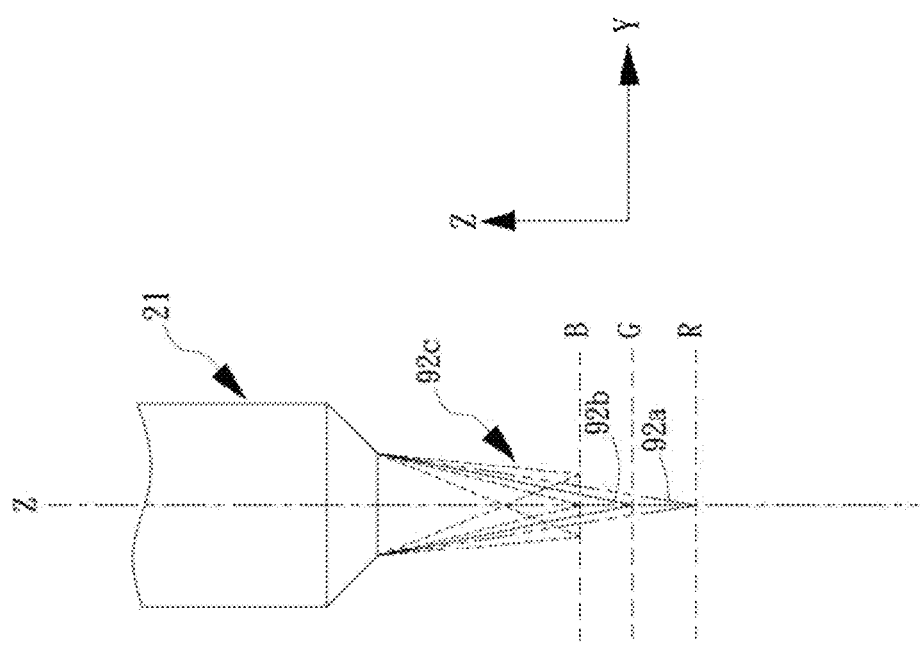
FIG. 4 is a schematic diagram showing the formation of a plurality of sub linear light fields in the present invention with respect to a YZ-plane defined in a Cartesian coordinate system.
Figure 5C:
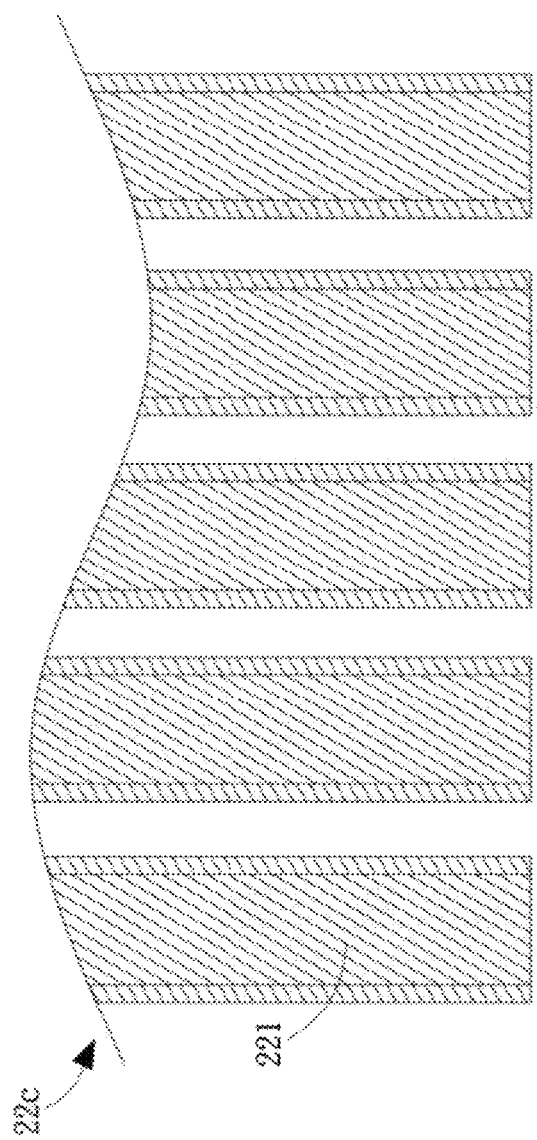

Please refer to FIG. 4, which is a schematic diagram showing the formation of a plurality of sub linear light fields in the present invention with respect to a YZ-plane defined in a Cartesian coordinate system. For the plurality of sub linear light fields as the three exemplary sub linear light fields 92a, 92b, and 92c shown in FIG. 4, they are focused to form a straight optical line at different focal depths. For clarity, only the sub linear light field 92c is fully disclosed in FIG. 4 for illustration, but it is noted that the other two sub linear light fields 92a, and 92b are performed in the same way. As shown in FIG. 4 that each sub linear light field is focused as a straight line at different focal depth, information relating to the sectional profile of a measured object can be obtained by analyzing the light, reflected from the measured object, passing through the spatial light filter. Please refer to FIG. 5A to FIG. 5C, which shows three different embodiments of spatial filters according to the invention. In FIG. 5A, the spatial filter 22a is a slit; and in FIG. 5B, the spatial filter 22b is a pinhole array composed of a plurality of pinholes 220; and in FIG. 5C, the spatial filter 22c is an optical fiber array composed of a plurality of optical fibers 221.

Figure 6:
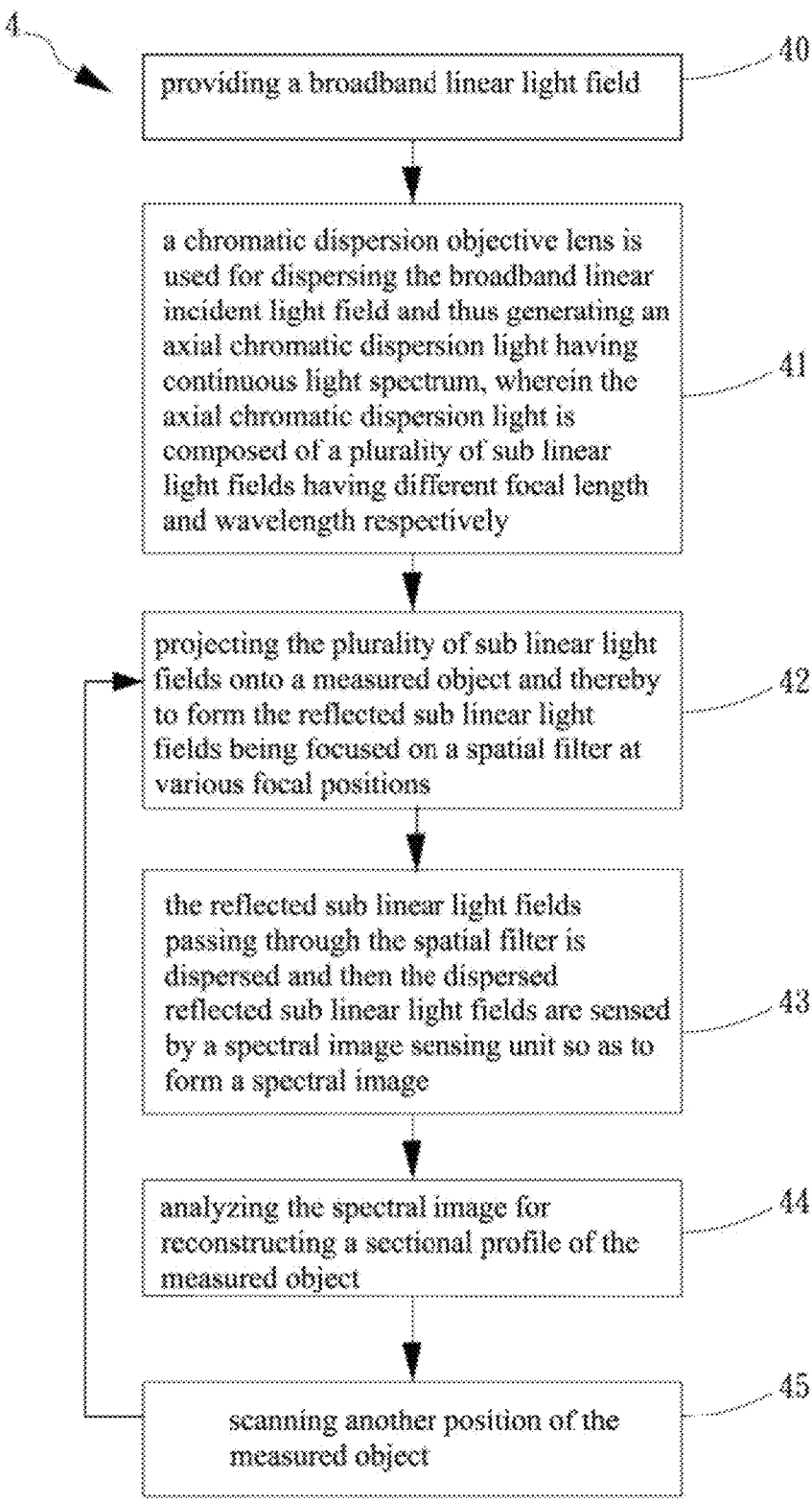
FIG. 6 is a flow chart depicting steps of a slit-scan multi-wavelength confocal microscopic method according to an embodiment of the invention.

Using the aforesaid slit-scan multi-wavelength confocal lens module, a slit-scan multi-wavelength confocal microscopic method can be designed and provided in the present invention. Please refer to FIG. 6, which is a flow chart depicting steps of a slit-scan multi-wavelength confocal microscopic method according to an embodiment of the invention. The flow 4 starts from step 40. At step 40, a broadband linear incident light field is provided; and then the flow proceeds to step 41. As the generation of the linear incident light field is similar to that shown in FIG. 2, it is not described further herein. At step 41, a chromatic dispersion objective lens is used for dispersing the broadband linear incident light field and thus generating an axial chromatic dispersion light having continuous light spectrum, wherein the axial chromatic dispersion light is composed of a plurality of sub linear light fields having different focal length and wavelength respectively.

Similarly, the axial chromatic dispersion light can be visible lights or/and invisible lights. Then the step 42 is performed to project the plurality of sub linear light fields onto a measured object and thereby to form the reflected sub linear light fields being focused on a spatial filter at various focal positions; and then the flow proceeds to step 43. At step 43, the reflected sub linear light fields passing through the spatial filter is dispersed and then the dispersed reflected sub linear light fields are sensed by a spectral image sensing unit so as to form a spectral image; and then the flow proceeds to step 44. At step 44, the spectral image is analyzed for reconstructing a sectional profile with respect to the measured object; and then the flow proceeds to step 45. At step 45, another position of the measured object is scanned as well as the step 42 to step 45 are repeated till the surface profile of the measured object is obtained. It is noted that for obtaining a full-field surface profile of a measured object, the measured object can be activated to perform a linear displacement movement to change the position for enabling the plurality of sub linear light fields to scan the thorough surface of the measured object such that the surface profile of the measured object can be reconstructed.

Figure 7:
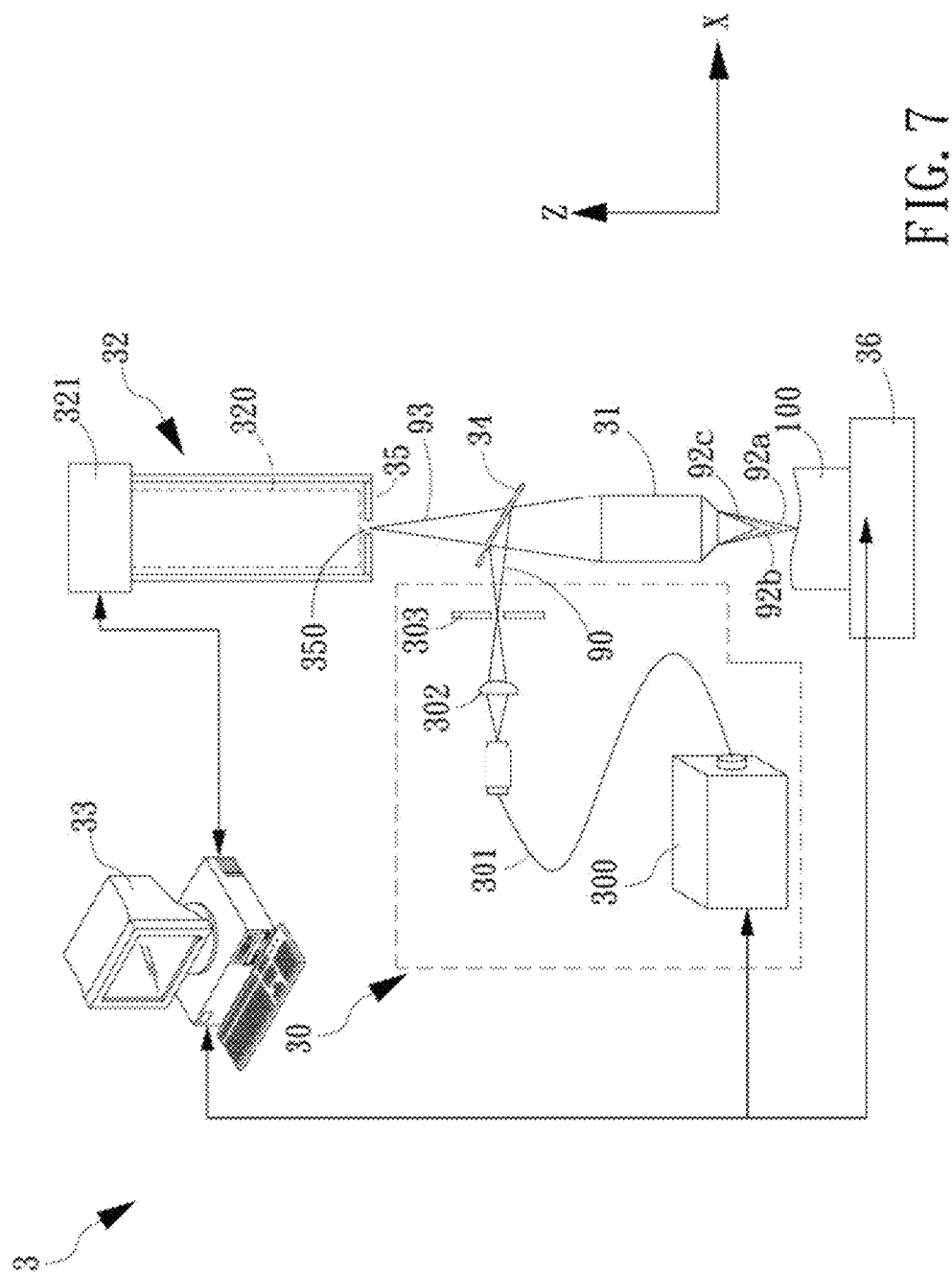
FIG. 7 is a schematic diagram showing a slit-scan multi-wavelength confocal microscopic system according to an embodiment of the invention.

Please refer to FIG. 7, which is a schematic diagram showing a slit-scan multi-wavelength confocal microscopic system according to an embodiment of the invention. In this embodiment, the lit-scan multi-wavelength confocal microscopic system 3 comprises a light source module 30, a chromatic dispersion objective lens 31, a spectral image sensing unit 32 and a processing unit 33. The light source module 30 is provided for generating a linear incident light field 90 which can be a broadband linear light field in this embodiment. Moreover, the light source module 30 includes a light source 300, a light guide 301, a lens set 302 and a filter 303 that they are configured in the same way as those shown in FIG. 2 and thus are not described further herein. Similarly, the chromatic dispersion objective lens 31 is also configured the same as that shown in FIG. 2 and thus is not described further herein. In FIG. 7, the linear incident light field 90 is directed by a light-dispersion module beam splitter 34 to travel toward the chromatic dispersion objective lens 31. The chromatic dispersion objective lens 31, the same as the structure illustrated in FIG. 3A or FIG. 3B, modulates the linear incident light field 90 into a plurality of sub linear light field 92a, 92b, and 92c being projected onto the surface of an object 100 and thereby being reflected from the surface of the object 100. The reflected linear light field 93 comprising the plurality of the reflected sub linear light fields travels back to the beam splitter 34 and then focus on the spatial filter 35 which is disposed at the confocal plane of the plurality of sub linear light fields 92a, 92b, and 92c. In this embodiment, the spatial filter 35 is a slit 350 for matching the type of the reflected light field 93 so as to allow the reflected light field 93 to pass therethrough, however, it is not limited thereby and can be structured as those shown in FIG. 5B and FIG. 5C.

Figure 8A:
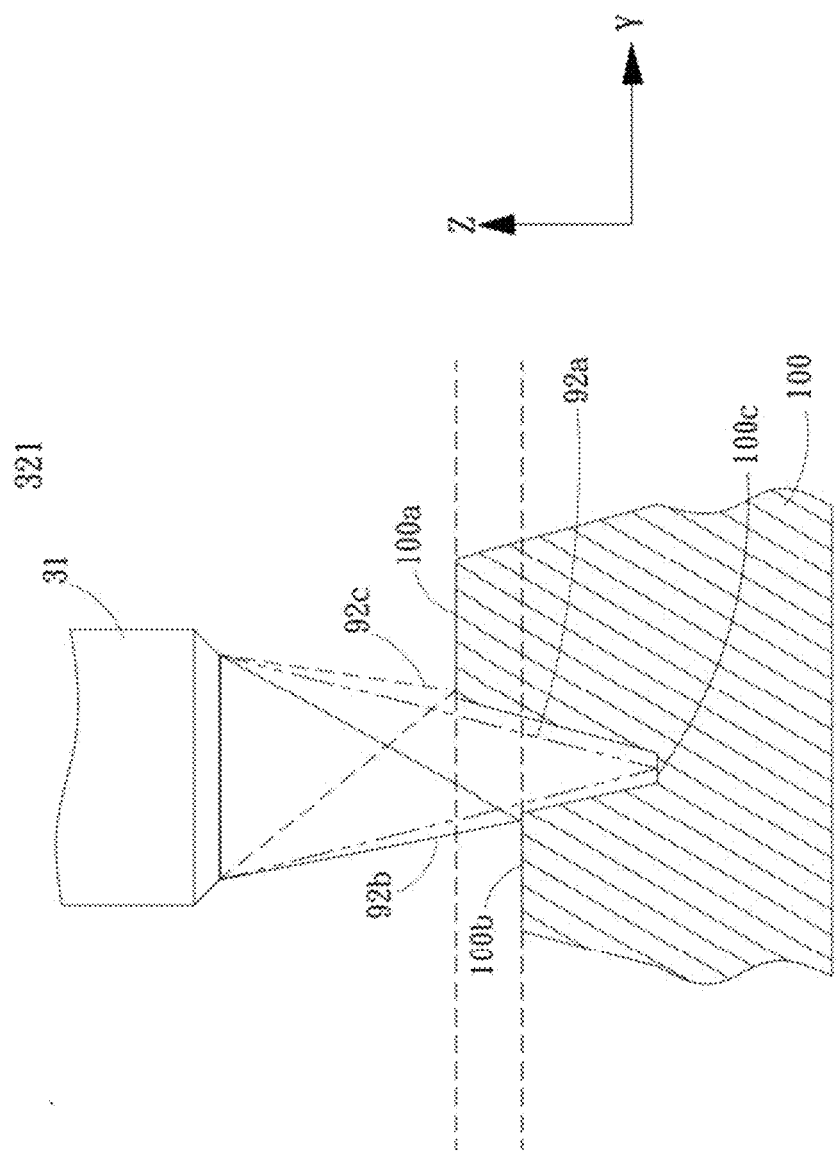
FIG. 8A is a schematic diagram showing how the plurality of sub linear light fields of the invention are projected and focused onto a measured object at different sectional positions.
Figure 8B:
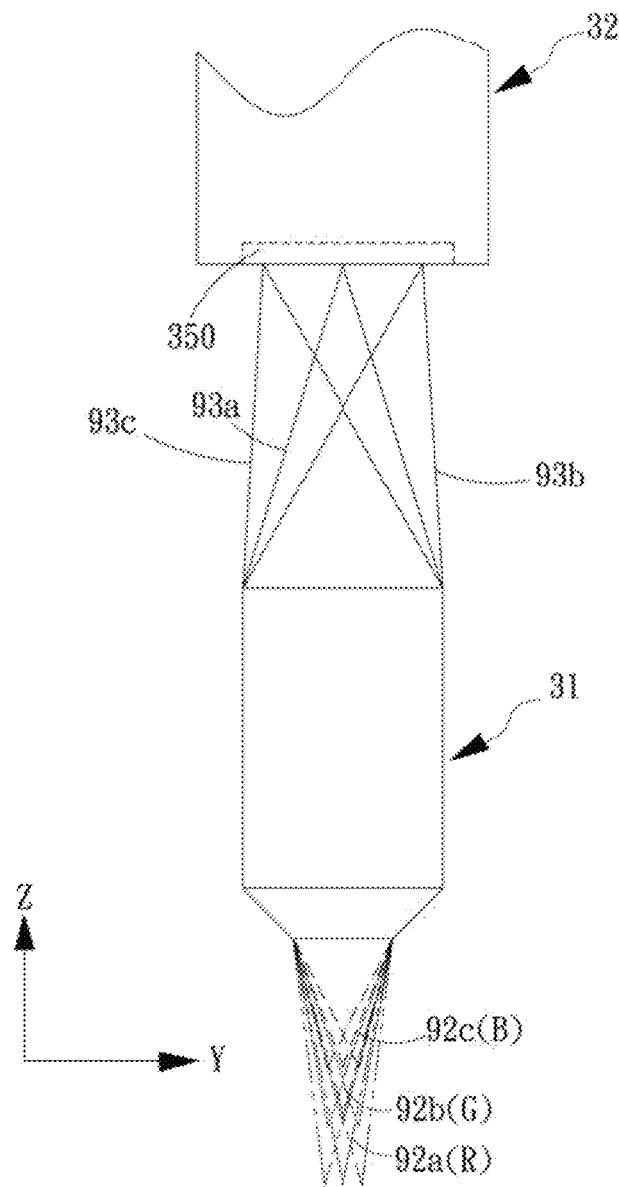

The spectral image sensing unit 32 is used for dispersing and sensing the filtered reflected light field 93 so as to form a spectral image. In the embodiment shown in FIG. 7, the spectral image sensing unit 32 has a light dispersion module 320 and an image sensor 321, in which the light dispersion module 320 is coupled to a side of the spatial filter 35 for dispersing the filtered reflected light field 93 passing the spatial filter 35; and the image sensor 321 is coupled to the light dispersion module 320 for sensing the filtered light fields being dispersed by the light dispersion module 320 so as to form the spectral image. Please refer to FIG. 8A, which is a schematic diagram showing how the plurality of the sub linear light fields of the invention are projected and focused onto a measured object at different sectional positions. As shown in FIG. 8A, the surface of the measured object 100 is a rugged surface so that the projection of the three exemplary sub linear light fields 92a, 92b, and 92c onto the surface of the measured object 100 are focused at different focal depths corresponding to the undulation of the rugged surface where they are reflected back to the chromatic dispersion objective lens 21 so as to form the reflected light fields 93a, 93b, 93c. As shown in FIG. 8B and FIG. 8C, the reflected light fields 93a, 93b, 93c are focused on the same confocal plane defined by the spatial filter 35 wherein each of the reflected light fields 93a, 93b, 93c can be a light field combining the three exemplary sub linear light fields 92a, 92b, and 92c. Taking the position 100c shown in FIG. 8A as an example, only the sub linear light field 92a can be focused thereat so that the reflected light corresponding to the sub linear light filed 92a therefrom can be focused within a comparatively smaller range on the confocal plane defined by the spatial filter 35 while the reflection of the other two sub linear light fields 92b, and 92c associated with the position 100c are focused and distributed in a large area, which is illustrated in FIG. 8C. Similarly, for the position 100b, only the sub linear light field 92b is focused thereat so that its reflection can be focused within a comparatively smaller range on the confocal plane defined by the spatial filter 35; and for the position 100a, only the sub linear light field 92c is focused thereat so that its reflection can be focused within a comparatively smaller range on the confocal plane defined by the spatial filter 35. As each of the reflections relating to the three exemplary sub linear light fields 92a, 92b, 92c are filtered by the slit 350, only those having small focus range can pass the slit 350, that is, only those sub linear light fields that are focused right on the surface of the measured object 100 are able to pass the slit 350 whereas, for the other sub linear light fields whose focal point are not right on the surface of the measured object 100, only a portion of their reflection is capable of passing the slit 350 since they are distributed in a wider range over the width of the slit 350.

Figure 8D:
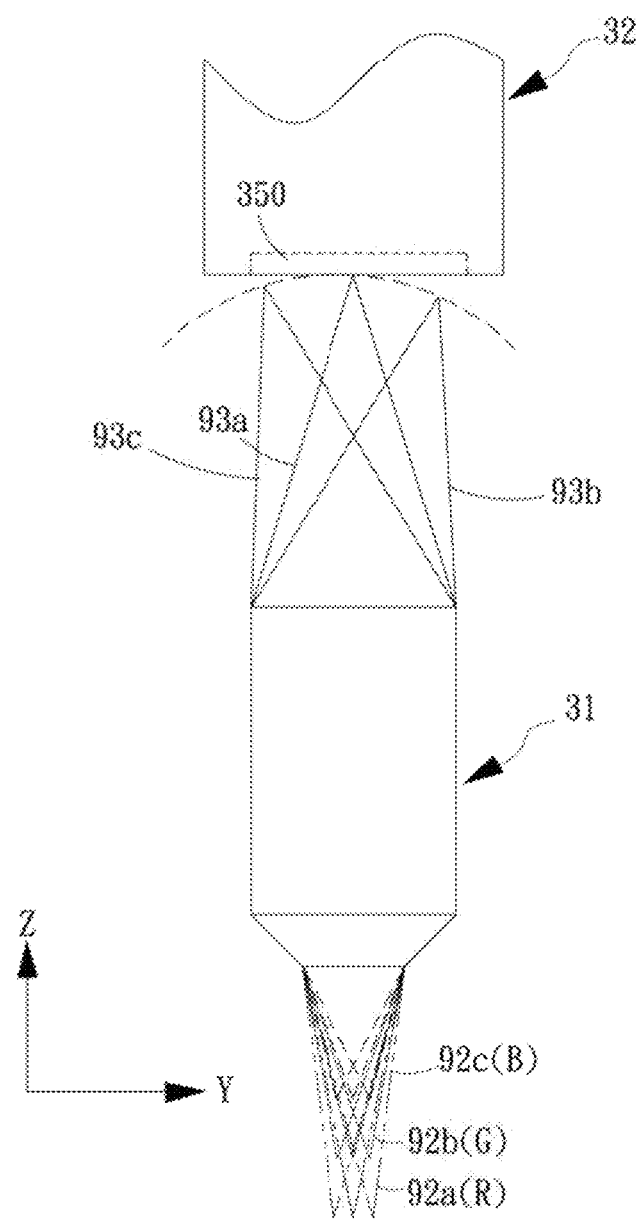
FIG. 8D is a schematic diagram showing how a curvature of field can be created by the focusing of the reflected sub linear light fields onto the spatial filter.

Moreover, the chromatic dispersion objective lens of the invention is designed with a capability for eliminating field curvature so as to focus each reflected light field on a same confocal plane. Please refer to FIG. 8D, which is a schematic diagram showing how can a field curvature be created by the focusing of the reflected sub linear light fields onto the spatial filter. For the conventional lens without specific design and modification, the off-axis light reflected from the object will induce problem of field curvature after passing the lens such that the reflected light fields can not focus on the same plane. Therefore, it is intended in the present invention to use common commercial optical software, such as Zemax but not limited thereby, to adjust the materials, the dispositions and curvatures of those lenses having chromatic aberration in the chromatic dispersion objective lens for the purpose of enabling every reflected light field to be focus on the same plane.

Figure 9:
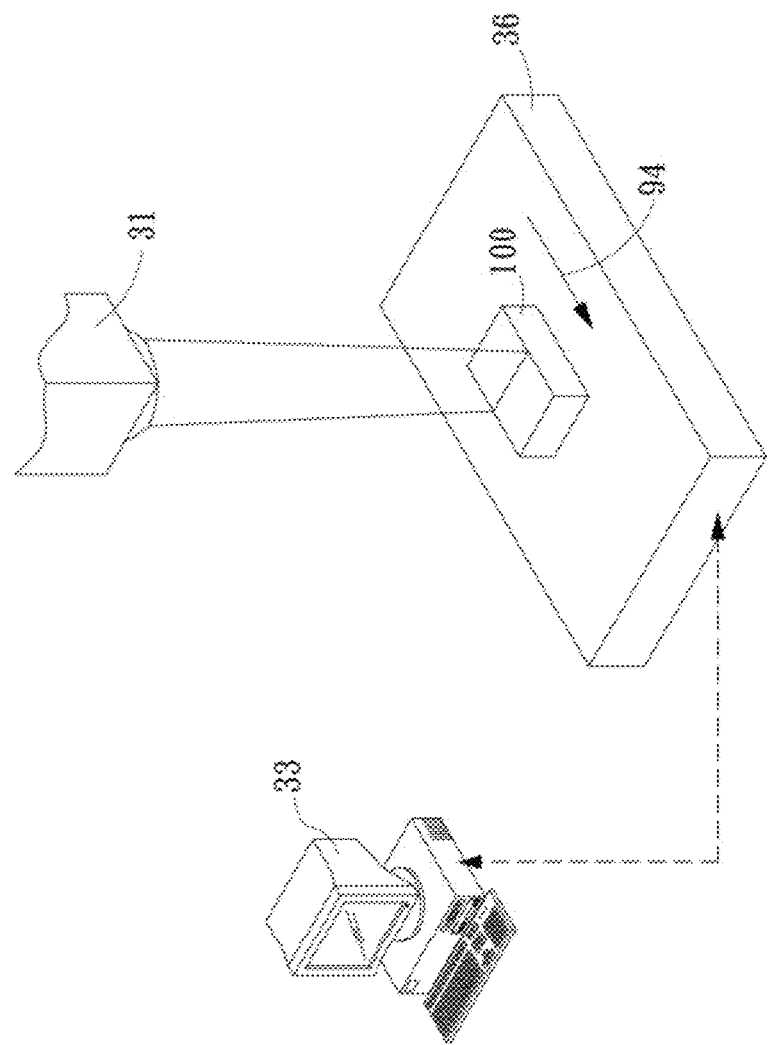
FIG. 9 shows a scanning operation of a slit-scan multi-wavelength confocal microscopic system of the invention.

As shown in FIG. 7, the light fields passing the spatial filter 35 will be dispersed by the light dispersion module 320 and then being imaged by the two-dimensional image sensor 321 so as to obtain a spectral image. Since the stronger the intensity of the light field passes through the spatial filter 35, the larger the scale with respect to the intensity of sub linear light field can be sensed by the image sensor 321 and the focal length with respect to each sub linear light field is known, it is capable of determining the depth of the cross sectional of the measured object according to the spectrum distribution of the spectral image. Taking a location of the surface of the measured object such as the position 100c shown in FIG. 8A as an example, in FIG. 8A, only the sub linear light field 92a is focused thereat so that its reflection can be focused within a comparatively smaller range on the confocal plane while the reflection of the other two sub linear light fields 92b, and 92c are distributed in a large area, which means that the focal positions of the two sub linear light fields 92b, and 92 are different from the focal position of the sub linear light field 92a, so that there are much more sub linear light field 92a being allowed to pass through the slit than the other two sub linear light fields 92b, and 92c, and thus by analyzing intensity of the spectral image, it is clearly identifiable and known exactly which sub linear light field is the one focused on the position 100c. In this embodiment, the image sensor 321 can be a CCD device or a COMS device. Moreover, the processing unit 33 is electrically coupled with the spectral image sensing unit 32 and the light source module 30 for receiving and processing the spectral image so as to generate a sectional profile of the measured object. In addition, the processing unit 33 is further electrically connected to a platform 36 carrying the measured object for controlling the platform 36 to perform a linear displace movement. Please refer to FIG. 9, which shows a scanning operation of a slit-scan multi-wavelength confocal microscopic system of the invention. In FIG. 9, when the platform 36 is activated to perform a linear displacement movement 94 by the control of the processing unit 33 during the measured object 100 is being inspected by a linear light field, the whole surface of the measured object 100 is scanned thoroughly such that a full-field surface profile of a measured object can be obtained.

Figure 10:
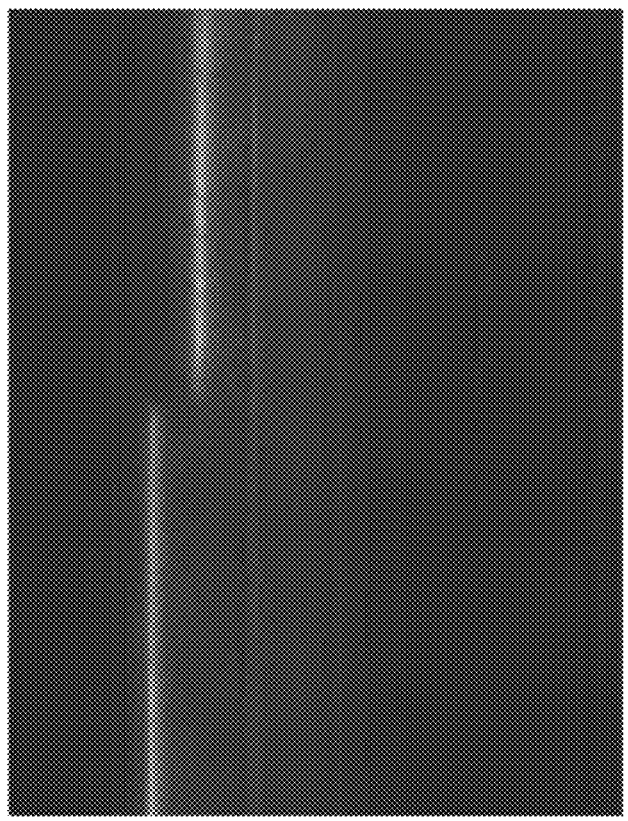
FIG. 10 shows a measurement using a gage block of height 50.5 μm whereas the horizontal axis represents spatial position and the vertical axis represent spectrum.
Figure 11:
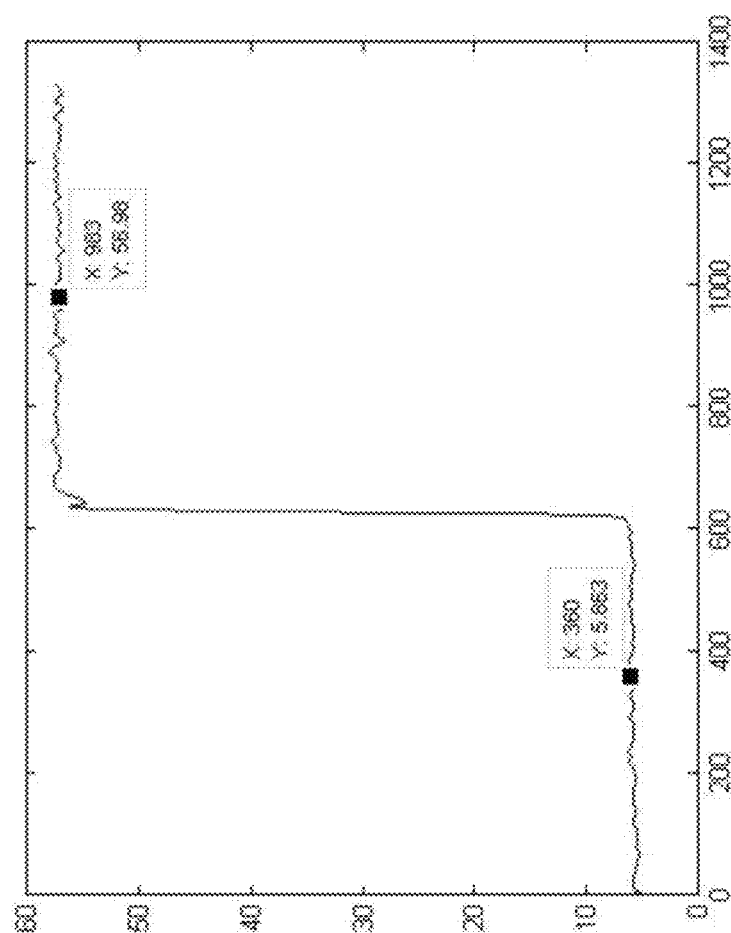
FIG. 11 shows another measurement using a gage block of height 50.5 μm whereas the horizontal axis represents spatial position and the vertical axis represents depth.
Figure 12:
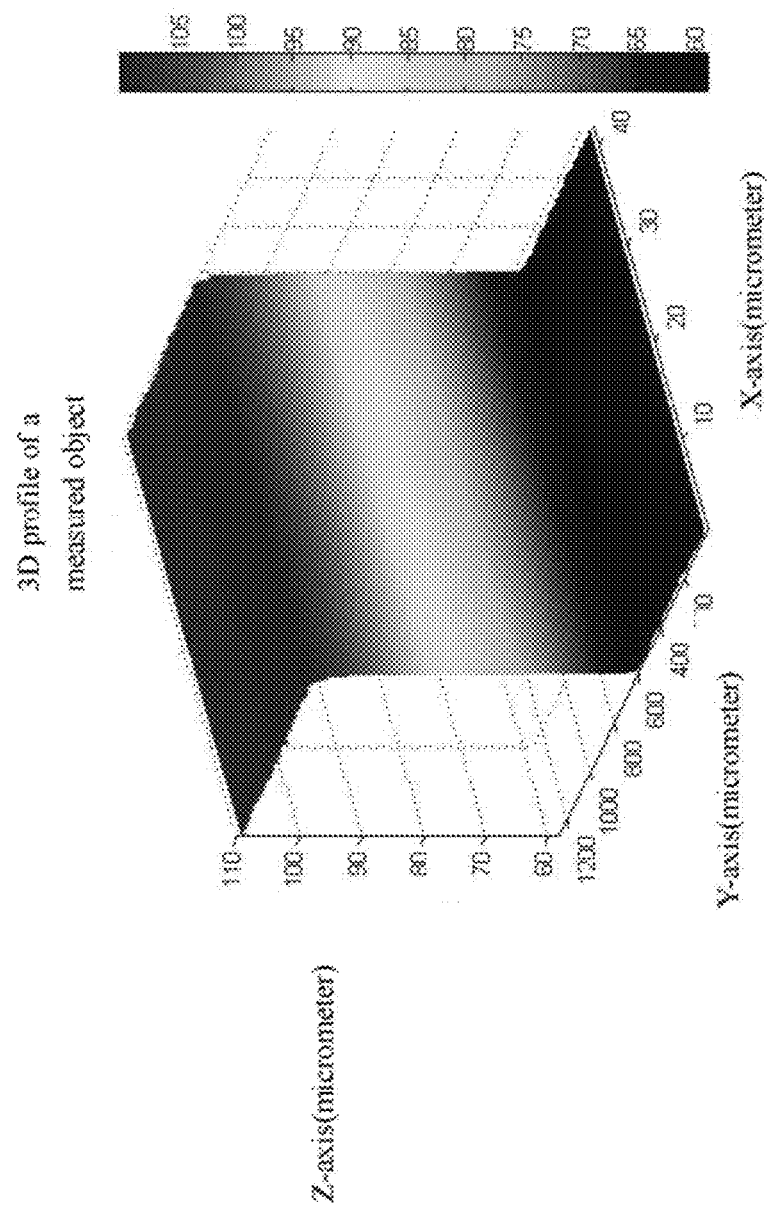
FIG. 12 is a schematic diagram showing a three-dimensional surface profile of a measured object obtained in a transverse displacement movement.

When the slit-scan multi-wavelength confocal microscopic system 3 is used for inspecting a gage block of height 50.5 µm, a spectral image containing spatial, intensity, and spectrum information can be obtained by the used of a spectrometer as the one shown in FIG. 10. By detecting a peak position with respect to the filtered spectrum along the scanning line in the spectral image, the information relating to the depth of each position on the surface of gage block can be obtained to be used for establishing the sectional profile of the measured surface, as shown in FIG. 11. Thereafter, by the use of the linear displacement movement of the platform and the spectral imaging of a measured object during the movement, a three-dimensional surface profile of the measured object can be reconstructed, as shown in FIG. 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A slit-scan multi-wavelength confocal microscopic system, comprising:
   a linear light source module, for providing a linear light field, the linear light source module further comprising:
      a light source providing an incident light;
      a lens set coupled to the light source for modulating the incident light into a focusing light beam; and
      a first spatial filter spatially filtering the focusing light beam thereby forming the linear light field;
   a second spatial filter;
   a chromatic dispersion objective lens, disposed at a side of the linear light source module, the chromatic dispersion objective lens dispersing the linear light field thereby generating an axial chromatic dispersion light comprising a plurality of sub linear light fields having different focal lengths and corresponding wavelengths respectively wherein each sub linear light field is focused to form a straight optical line, and enabling the plurality of the sub linear light fields reflected from an object passing therethrough to focus on the second spatial filter at various focal positions;
   a spectral image sensing unit, for dispersing and sensing the plurality of the reflected sub linear light fields so as to form a spectral image; and
   a processing unit, electrically coupled with the spectral image sensing unit and the light source module for receiving and processing the spectral image so as to generate a sectional profile with respect to the object.

2. The slit-scan multi-wavelength confocal microscopic system of claim 1, wherein the plurality of the sub linear light fields form a light field having a continuous spectrum.

3. The slit-scan multi-wavelength confocal microscopic system of claim 1, wherein the linear light source module is substantially a broadband light source.

4. The slit-scan multi-wavelength confocal microscopic system of claim 1, wherein the second spatial filter is a device selected from the group consisting of: a slit, an optical fiber array, and a pinhole array.

5. The slit-scan multi-wavelength confocal microscopic system of claim 1, wherein the spectral image sensing unit further comprises:
   a light dispersion module, coupled to a side of the second spatial filter, for dispersing the reflected sub linear light fields passing through the second spatial filter thereby forming a plurality of dispersed sub linear light fields; and
   an image sensor, coupled to the light dispersion module, for sensing the plurality of the dispersed sub linear light fields so as to form the spectral image.

6. The slit-scan multi-wavelength confocal microscopic system of claim 1, wherein the lens set can be cylindrical lens or a semi-cylindrical lens.

7. The slit-scan multi-wavelength confocal microscopic system of claim 1, further comprising:
   a linear motion platform, for carrying the object to perform a linear displacement movement.

8. A slit-scan multi-wavelength confocal microscopic method, comprising the steps of:
   providing a linear light field by a light source module comprising a light source which provides an incident light, a lens set which is coupled to the light source for modulating the incident light into a focusing light beam, and a first spatial filter which spatially filters the focusing light beam thereby forming the linear light field;
   using a chromatic dispersion objective lens for dispersing the linear light field thereby generating an axial chromatic dispersion light comprising a plurality of sub linear light fields having different focal lengths and corresponding wavelengths respectively wherein each sub linear light field is focused to form a straight optical line;
   enabling the plurality of the sub linear light fields to be reflected from an object through the chromatic dispersion objective lens and focus on a second spatial filter at various focal positions and passing therethrough, wherein the chromatic dispersion objective lens eliminates field curvature caused by off-axis lights reflected from the object so as to focus each reflected sub linear light field on a same confocal plane defined by the second spatial filter;

dispersing the plurality of the reflected sub linear light fields passing through the second spatial filter;

sensing the plurality of the dispersed reflected sub linear light fields so as to form a spectral image; and analyzing the spectral image for reconstructing a sectional profile with respect to the object.

9. The method of claim 8, wherein the plurality of the sub linear light fields form a light field having a continuous spectrum.

10. The method of claim 8, wherein the linear light field is provided by a broadband light source.

11. The method of claim 8, further comprising a step of:

enabling the object to perform a linear displacement movement for obtaining information relating to the surface profile of the object.

12. The method of claim 8, wherein the second spatial filter is a device selected from the group consisting of: a slit, an optical fiber array, and a pinhole array.

* * * * *